United States Patent [19]

Miller

[11] Patent Number: 4,609,819
[45] Date of Patent: Sep. 2, 1986

[54] SEALING ARRANGEMENT FOR ENCAPSULATED LENGTH OR ANGLE MEASURING SYSTEM

[75] Inventor: Walter Miller, Traunstein, Fed. Rep. of Germany

[73] Assignee: Dr. Johannes Heidenhain GmbH, Traunreut, Fed. Rep. of Germany

[21] Appl. No.: 664,033

[22] Filed: Oct. 31, 1984

[30] Foreign Application Priority Data

Nov. 11, 1983 [DE] Fed. Rep. of Germany ....... 3340863

[51] Int. Cl.⁴ .......................... H01J 3/14; B65D 53/00
[52] U.S. Cl. ................................ 250/237 G; 277/135; 277/DIG. 7
[58] Field of Search .......................... 277/135, DIG. 7; 250/237 G, 231 SE; 356/395; 340/347 P

[56] References Cited

U.S. PATENT DOCUMENTS 3,331,608  7/1967  Charrault et al. ................... 277/135
4,136,958  1/1979  Nelle ................................ 250/237 G
4,564,294  1/1986  Ernst ................................ 250/237 G

*Primary Examiner*—David C. Nelms
*Assistant Examiner*—William L. Oen
*Attorney, Agent, or Firm*—Willian Brinks Olds Hofer Gilson & Lione Ltd.

[57] ABSTRACT

An encapsulated length or angle measuring system includes a follower or a coupling member which extends through a slit in a housing of the measuring system. Thus slit is sealed off against harmful environmental influences by sealing elements which extend along the slit and are spread open by the coupling member in the region where the coupling member passes out of the housing through the slit. This spreading of the sealing elements can result in sealing problems. In order to provide better sealing, the sealing elements are formed as thin, resilient metal sheets which define chambers on their active sealing surfaces which contain a sealing fluid. This sealing fluid, by means of adhesion and capillary action on the follower or coupling member, seals off the extremely fine gaps which are typically present between the follower or coupling member and the sealing lips.

4 Claims, 3 Drawing Figures

SEALING ARRANGEMENT FOR ENCAPSULATED LENGTH OR ANGLE MEASURING SYSTEM

BACKGROUND OF THE INVENTION

The present invention relates to an improved sealing arrangement for an encapsulated measuring system for measuring the relative position of two objects movable relative to one another, of the type which comprises a housing adapted to be mounted to one of the objects, which housing defines a slit extending in the measuring direction, a measuring component mounted for movement within the housing, and a coupling member mounted to the measuring component to extend out of the slit and adapted to be mounted to the other of the two objects.

In general, in encapsulated measuring systems a longitudinal slit is provided in the housing of the measuring system, and a coupling member extends through this longitudinal slit into the interior of the housing in order to connect a measuring component within the housing such as a scanning unit with a mounting element arranged outside the housing for mounting the coupling member and thereby the measuring component to one of the two objects to be measured. For example, the two objects to be measured can take the form of the bed and the slide piece of a processing machine. In this case, relative movement between the bed and slide piece of the processing machine is transferred to the measuring graduation mounted within the housing of the measuring system or to the scanning unit mounted within the housing of the measuring system. The coupling member is moved in the direction of movement along the length of the slit, thereby causing the measuring component coupled to the coupling member to move in accordance with the movement being measured.

Typically, it is important to protect the highly sensitive measuring graduation included in the measuring system and for this reason the slit in the housing is sealed as closely as possible. Typically, it is in the region where the coupling member passes through the slit that sealing problems are particularly acute and contaminants are most likely to pass into the interior of the housing.

A measuring system of the type described above is shown, for example, in German Patent DE-PS 28 46 768. In this measuring system a scale and a scanning unit are mounted within a housing which defines a slit oriented in the measuring direction. This slit is closed by means of sealing elements which are arranged to meet at an acute angle. These sealing elements take the form of synthetic material or rubber lips, through which the coupling member passes in order to connect the scanning unit with one of the two objects to be measured.

In this measuring system the sealing lips preferably press closely against the coupling member, and are therefore constructed of a resilient elastic material which provides a high restoring force in order to obtain the most hermetic sealing possible of the housing. These high restoring forces can result in high frictional forces between the sealing lips and the coupling member when the coupling member moves along the measuring direction. These high frictional forces can cause deformations of the coupling member in the measuring direction which are, of course, detrimental to measuring accuracy. Furthermore, the bending open of the sealing lips by the coupling member results in a twisting of the sealing lips along the longitudinal extent of the slit. This twisting causes the formation of small zones at the ends of the coupling member which are not entirely sealed by the sealing lips, even when the coupling member is provided with a convex, sword-shaped cross section.

German Patent DE-PS 24 60 406 for this reason suggests the use of a magnetic fluid in such a measuring system in order to seal the gaps between the sealing elements or lips. A magnetic field is used to retain the magnetic fluid in the gaps between the sealing elements in order to provide a more nearly hermetic seal.

The sealing elements described above have been selected as particularly relevant prior art approaches from a large number of publications. These sealing elements can provide an adequate degree of sealing for most applications. However, since the sealing elements described above are made essentially of elastic synthetic material or rubber lips, they do not provide adequate protection against damage to or destruction of the sealing lips by mechanical action.

Measuring systems are often used in conjunction with shaving or chipping machine tools such as milling machines for example. Precisely in the case of such uses hot metallic chips are present near the measuring system, and these hot metal chips may come into contact with the synthetic material sealing lips and destroy them.

SUMMARY OF THE INVENTION

The present invention is directed to an improved sealing arrangement for a measuring system in which the slit in the housing of the measuring system is sealed in a manner which is extremely resistant to mechanical damage yet which provides excellent sealing properties.

According to this invention, a measuring system of the type described initially above is provided with means for covering the slit around the coupling member. This covering means comprises at least one thin resilient metal sheet which is shaped to seal against the coupling member in a sealing zone. In addition, the covering means defines a chamber in communication with the sealing zone, which contains a sealing fluid effective to reduce friction and enhance sealing between the coupling means and the coupling member.

The present invention provides important advantages in terms of a sealing arrangement which is extremely resistant to mechanical damage, even in the context of an environment which includes incandescent metal chips or shavings. This extreme mechanical resistance is provided in combination with effective sealing against liquid coolants and the like which may be present near the measuring system. The sealing fluid operates to reduce friction between the sealing sheets and the follower and, when the sealing fluid includes lubricants, this friction can be reduced to extremely low values.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
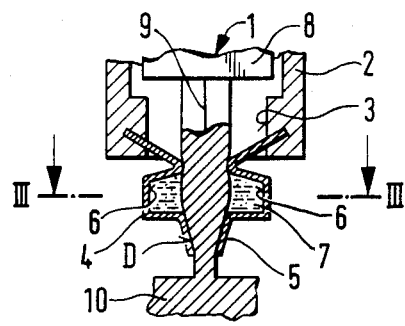
FIG. 1 is a schematic partial cross-sectional view of a measuring system which incorporates a first preferred embodiment of this invention.

Turning now to the drawings, FIG. 1 shows a partial cross-sectional schematic representation of a measuring system 1 which includes a housing 2 which defines on one longitudinal side a slit 3 running in the measuring direction. This slit 3 is sealed by metal lamellae 4 and 5 which are thin metallic resilient sheets which operate to prevent contaminants (such as chips, shavings and coolants that may be present in the use of the measuring system on a material removing machine tool) from entering into the interior of the housing 2 of the measuring system 1. The metal lamellae 4, 5 are shaped in such a way that a chamber 6 is formed in the region of a sealing zone, and this chamber 6 contains a sealing fluid 7.

Figure 3:
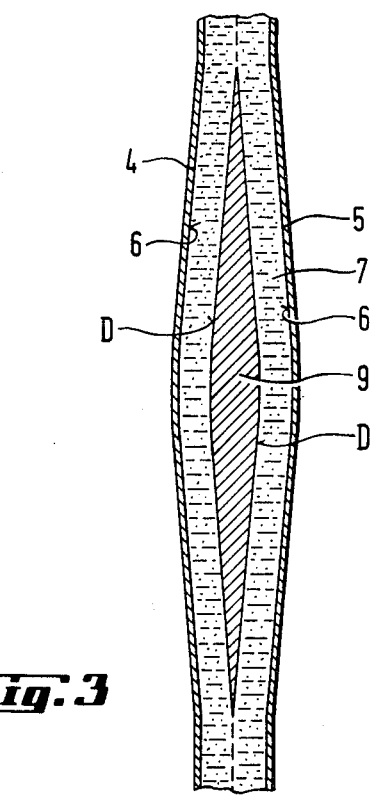
FIG. 3 is a sectional view taken along line III—III of FIG. 1.

A scanning component 8 is mounted for movement in the interior of the housing 2, and this scanning component 8 scans a measuring graduation (not shown) in a known manner. The scanning component 8 is connected with a mounting foot 10 via a follower or coupling member 9. This coupling member 9 establishes a mechanical connection between the scanning component 8 and one of the objects (not shown), the relative movement of which is to be measured. Thus, the coupling member 9 extends between the metal lamellae 4,5 into the interior of the housing 2 at a position determined by the instantaneous position of the object to be measured. This causes a local spreading or separation of the metal lamellae 4,5, as is schematically shown in FIG. 3. The sealing fluid 7 is in contact with the surfaces of the coupling member 9, and it is the sealing fluid 7 which forms the active sealing surfaces D. In consequence of well-known fluid adhesion phenomena, any remaining small gaps, as for example at the ends of the coupling member 9, are also sealed off with the sealing fluid 7.

It is especially advantageous if the chamber 6 is connected to the lubricating system of the machine, so that the sealing fluid 7 is circulated within the chamber 6. In this event, the chamber 6 has a relatively large volume as shown in FIG. 1.

Figure 2:
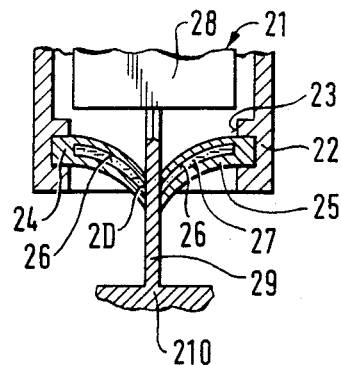
FIG. 2 is a schematic partial cross-sectional view of a measuring system which incorporates a second preferred embodiment of this invention.

FIG. 2 shows a second preferred embodiment which is many ways similar to the embodiment shown in FIGS. 1 and 3. In FIG. 2 elements corresponding to elements of FIG. 1 bear the same reference numbers, but prefixed with the digit 2 in order to provide distinct reference numerals for the elements of FIGS. 1 and 2.

In FIG. 2, the sealing elements 24,25 are constructed as metal lamellae that can carry on the side facing the interior of the housing 22 a layer of an elastic synthetic material. Chambers 26 can be formed in this layer of elastic synthetic material, and these chambers 26 preferably have a very small volume, such that the sealing fluid 27 by reason of the capillary effect remains in the chambers 26. The sealing fluid 27 comes into contact with the coupling member 29 at the sealing surfaces 2D in order to provide the desired hermetic sealing. The metallically laminated sealing elements 24,25 provide an elastic biasing force which holds the sealing elements 24,25 together and in contact with the coupling member 29. Because of the lubricating effect of the sealing fluid 27, frictional forces exerted on the coupling member 29 are markedly reduced, and because the metal lamellae 24,25 present an uninterrupted metal surface to the exterior of the housing 22, the sealing apparatus is extremely resistant to mechanical deformation.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In an encapsulated measuring system for measuring the relative position of two objects movable relative to one another, of the type comprising a housing, adapted to be mounted to one of the two objects, which defines a slit extending in the measuring direction; a measuring component mounted for movement in the housing; and a coupling member coupled to the measuring component to extend out of the slit and adapted to be mounted to the other of the two objects, the improvement comprising:

means for covering the slit around the coupling member, said covering means comprising at least one thin, metal, resilient sheet shaped to seal against the coupling member in a sealing zone, said covering means defining a chamber in communication with the sealing zone, which chamber contains a sealing fluid operative to reduce friction and enhance sealing between the covering means and the coupling member.

2. The invention of claim 1 wherein the chamber defines a large volume and wherein the chamber is connected to means for circulating the sealing fluid in the chamber.

3. The invention of claim 1 wherein the chamber defines a small cross-sectional dimension such that capillary action retains the sealing fluid in the sealing zone.

4. The invention of claim 1 wherein the sealing fluid comprises a friction reducing additive.

* * * * *